United States Patent [19]
Lauer et al.

[11] Patent Number: 4,543,726
[45] Date of Patent: Oct. 1, 1985

[54] APPARATUS FOR ASCERTAINING THE POSITIONS OF OPENINGS IN BULKY WORKPIECES

[76] Inventors: Gerhard Lauer, Grosswaldstrasse 6, D-6686 Eppelborn; Alfred Morawietz, Oderring 13, D-6610 Lebach; Jürgen Wild, Am Stehlsberg 4, D-6601 Riegelsberg, all of Fed. Rep. of Germany

[21] Appl. No.: 549,607

[22] Filed: Nov. 7, 1983

[30] Foreign Application Priority Data

Nov. 11, 1982 [DE] Fed. Rep. of Germany ....... 3241747

[51] Int. Cl.⁴ ............................................... G01B 7/31
[52] U.S. Cl. ................................ 33/180 R; 33/172 D; 33/169 C; 33/542
[58] Field of Search ............ 33/180 R, 181 R, 172 D, 33/169 C, 185 R, 169 R, 174 R

[56] References Cited
U.S. PATENT DOCUMENTS 2,779,040  1/1957  Scarff ................................. 33/180 R
2,860,419  11/1958  Müller ............................... 33/172 D
2,872,737  2/1959  Müller ............................... 33/172 D
4,060,906  12/1977  Heizmann ......................... 33/172 D Primary Examiner—Willis Little
Attorney, Agent, or Firm—Peter K. Kontler

[57] ABSTRACT

An apparatus for ascertaining the extent of deviation of the actual position of a hole in a bulky workpiece from the desired position has a mandrel which is reciprocable to move its conical tip into and from the opening. The tip is followed by a main portion which fits snugly into the opening. If the hole is out of position, the mandrel is shifted laterally during penetration of its tip into the hole as a result of sliding movement of the external surface of the tip relative to the surface surrounding the hole. The extent of lateral movement of the mandrel in several direction is monitored by discrete gauges which transmit signals denoting the extent of deviation of actual position of the hole from the desired position in the respective directions. A third gauge can monitor the extent of axial movement of the mandrel into the hole before a collar behind the main portion strikes against the workpiece; such gauge can indicate whether or not the hole is in proper position as considered in the axial direction of the mandrel.

23 Claims, 2 Drawing Figures

APPARATUS FOR ASCERTAINING THE POSITIONS OF OPENINGS IN BULKY WORKPIECES

BACKGROUND OF THE INVENTION

The present invention relates to apparatus or tools for gauging the openings of a workpiece, especially bulky workpieces which consist of sheet metal or the like. More particularly, the invention relates to improvements in apparatus for ascertaining the positions of openings in such workpieces.

It is frequently necessary to ascertain whether or not the opening in a workpiece is held in proper position for insertion of a screw, bolt, pintle, shaft, stud or the like. Such determination is particularly important when the part which is to be received in the opening is manipulated by an automatic tool which can insert the part only if the opening is maintained in a desired or optimum position with reference to the tool. In many instances, the openings are circular holes or bores, and it is then normally necessary that the axis of the hole or bore coincide exactly with the axis of the part which is to be inserted therein. The likelihood that the position of an opening will deviate from the anticipated or desired position when the workpiece which is formed with such opening assumes a position in which an automatic tool is to insert a part into the opening is particularly likely to arise if the workpiece consists of sheet metal which tends to undergo, and often undergoes, deformation in the course of a stamping, punching, profiling or analogous operation. For example, doors, hoods and other components of frames of motor vehicles are likely to be deformed during shaping so that the parts which serve to secure the components of the frame to each other are not likely to find their way into openings which are provided therefor. The actual position of an opening in a sheet-metal workpiece can deviate from the desired position in any one of practically infinite number of directions. In many instances, the deviation of the actual position from a desired or optimum position of the opening is not very pronounced; however, even a relatively slight deviation suffices to prevent an automatic tool from properly introducing parts into improperly positioned openings with the result that the workpiece and/or the part to be inserted is damaged or defaced and/or that the part simply cannot enter the opening. This can cause prolonged delays and losses in output when the workpieces are treated in a production line.

OBJECTS AND SUMMARY OF THE INVENTION

An object of the invention is to provide a novel and improved apparatus which is constructed and assembled in such a way that it can rapidly and accurately ascertain the extent of deviation of the actual position or positions of one or more openings in a workpiece, particularly in a bulky workpiece consisting of sheet metal or the like, from the desired or anticipated position or positions.

Another object of the invention is to provide an apparatus which can ascertain the actual position of the opening in a workpiece with a very high degree of accuracy and which can automatically indicate the extent of deviation as well as the direction or directions in which the actual position of the opening deviates from the desired position.

A further object of the invention is to provide a novel and improved method of gauging the positions of one or more openings in bulky workpieces preparatory to introduction into such openings of connecting, coupling, fastening, reinforcing and/or other parts by resort to automatic or semiautomatic inserting tools.

An additional object of the invention is to provide the apparatus with a novel and improved probe and with novel and improved means for confining the probe to movements in certain directions.

Another object of the invention is to provide a novel and improved apparatus which can be rapidly converted for the gauging of positions of openings having different sizes and/or shapes.

A further object of the invention is to provide the apparatus with novel and improved means for moving the probe in directions to insert the probe into or to withdraw it from an opening irrespective of whether the opening is or is not held in the desired position.

Still another object of the invention is to provide a relatively simple apparatus which can be rapidly calibrated or otherwise adjusted to ensure the detection of deviations between the actual and desired positions of openings with a requisite degree of accuracy.

The invention is embodied in an apparatus for ascertaining the extent of deviation between the desired position and the actual position of an opening having a predetermined size and being provided in a workpiece, especially in an apparatus for ascertaining the extent of deviation of the desired position of a round hole or bore having a predetermined diameter from the optimum position in a rather bulky workpiece which consists of sheet metal or the like. The apparatus comprises a probe in the form of a mandrel having a main portion arranged to fit rather snugly into the opening and a front or leading portion which is receivable in the opening with at least some clearance and merges gradually into the main portion to thus move the mandrel laterally (sideways) when it strikes the surface surrounding an improperly positioned opening prior to entry of the main portion into such opening, and means for supporting the mandrel in a starting position in which the main portion of the mandrel is in register with an opening that is held in the desired or optimum position. The mandrel is movable axially with reference to a portion of the supporting means to thereby introduce its front and main portions into or to withdraw such front and main portions from the opening, and the mandrel is further movable in the supporting means laterally from the aforementioned starting position in response to establishment of contact with and relative movement between the front portion and the surface surrounding an improperly positioned opening. The apparatus further comprises means for monitoring the extent of lateral movement of the mandrel from its starting position, this being an indication of the extent of deviation of the actual position of the opening from its desired position.

The supporting means comprises or carries means for confining the mandrel to lateral movements without any changes in orientation of the mandrel (e.g., the mandrel can remain vertical during movement toward, into and out of an improperly positioned opening). The monitoring means can comprise several gauges or other suitable means each of which is arranged to monitor the extent of lateral movement of the mandrel in one of several different directions, e.g., in two directions at right angles to one another.

The cross section of the main portion of the mandrel is preferably constant so that each part of the main portion can enter and fill an opening having a size just sufficient to receive the main portion in response to axial movement of the mandrel in a direction to introduce the main portion into as well as to move the main portion in the opening. The front portion of the mandrel can include the frustum of or a full cone, a hemisphere or a combination of a cone and a hemisphere, e.g., a cone with a hemispherical tip. The mandrel preferably further comprises a rear portion or stop (e.g., a collar whose cross-sectional area exceeds that of the main portion) which cannot enter the opening, which is located behind the main portion, and which can cause a further gauge to ascertain eventual other deviations of the actual position of the opening from the optimum position, particularly a deviation in the axial direction of the mandrel. Thus, if the mandrel is movable vertically and the workpiece is horizontal or substantially horizontal, the rear portion or stop of the mandrel enables the additional gauge to ascertain the exact level of the opening in that the additional gauge monitors the axial position of the mandrel at the time the stop strikes the workpiece and thus terminates further forward movement of the mandrel.

The means for moving the mandrel axially forwardly and backwards preferably comprises a fluid-operated motor, e.g., a double-acting pneumatic cylinder and piston unit which is coupled to the rear end portion of the mandrel.

The supporting means can comprise first guide means wherein the mandrel is movable axially and second guide means wherein the first guide means is movable at right angles to the axis of the mandrel so that the mandrel is free to move axially relative to the first guide means while the first guide means moves relative to the second guide means. The front, main and rear portions of the mandrel are preferably provided at one end of an elongated cylindrical shank which is reciprocable in a sleeve of the first guide means. The sleeve comprises an external flange which is disposed in a plane making an angle of 90 degrees with the axis of the mandrel, and the second guide means is arranged to maintain the flange in such plane while permitting the sleeve to move laterally, i.e., in such a way that the orientation of the axis of the mandrel remains unchanged. The second guide means preferably comprises ring-shaped first and second guide members which flank the flange. Antifriction rolling elements can be interposed between at least one of the guide members and the respective side of the flange. Such rolling elements can form an annulus and may constitute spheres which are confined in a ring-shaped cage.

The supporting means comprises a frame for one of the guide members and centering means for the other guide member so that the latter is held in a predetermined position with reference to the one guide member. If the guide members are rings, the centering means maintains the other ring in a position of concentricity with the one ring. To this end, the other ring can be provided with a conical surface and the centering means can comprise an annular centering insert which engages the conical surface to thereby hold the other ring in a position of concentricity with the one ring.

The second guide means preferably further comprises or cooperates with the aforementioned annuli of antifriction rolling elements which are interposed between the flange and the first and second guide members. Such annuli of rolling elements are movable in parallelism with the plane of the flange, and the apparatus further comprises biasing members constituting a means for yieldably opposing movements of the annuli of rolling elements relative to the respective guide members.

The rear end portion of the mandrel can constitute or comprise a short cylinder, and the supporting means can comprise means for centering the mandrel, namely, for moving the mandrel back to its starting position, in automatic response to retraction of the mandrel in a direction away from the workpiece. To this end, the centering means can comprise a cylindrical socket preceded by a frustoconical socket whose surface steers the rear end portion of the mandrel into the cylindrical socket during the last stage of each return stroke of the mandrel.

The monitoring means can comprise at least one lever which is pivotable by the flange of the first guide means when such flange is moved relative to the first and second guide members in response to penetration of the front portion of the mandrel into an opening whose position deviates from the desired position.

Means (such as a pair of interlinked parallel mechanisms) can be provided to hold the first guide means against rotation about the axis of the mandrel. The parallel mechanisms can be connected to the frame and to the first guide means, e.g., through the medium of a carrier for the motor which reciprocates the mandrel.

The monitoring means can comprise a gauge which ascertains the extent of axial movement of the mandrel while the latter penetrates into an opening until the rear portion or stop of the mandrel strikes against the workpiece. This gauge can furnish signals denoting whether or not the opening is in proper position as considered in the axial direction of the mandrel. The mandrel can be provided with a conical portion which is tracked by a sensor of the gauge during the last stage of movement of the mandrel toward a position in which the rear portion abuts against the workpiece. If the rear portion engages the workpiece prematurely, the opening is located at one side of its optimum position, as considered in the axial direction of the mandrel. If the engagement between the rear portion and the workpiece is too late, the opening is located at the other side of its optimum position, again as considered in the axial direction of the mandrel. The sensor of the gauge is preferably movable radially of the mandrel under the action of the conical portion, and the extent of radial movement of such sensor is indicative of the position of the opening, as considered in the axial direction of the mandrel.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
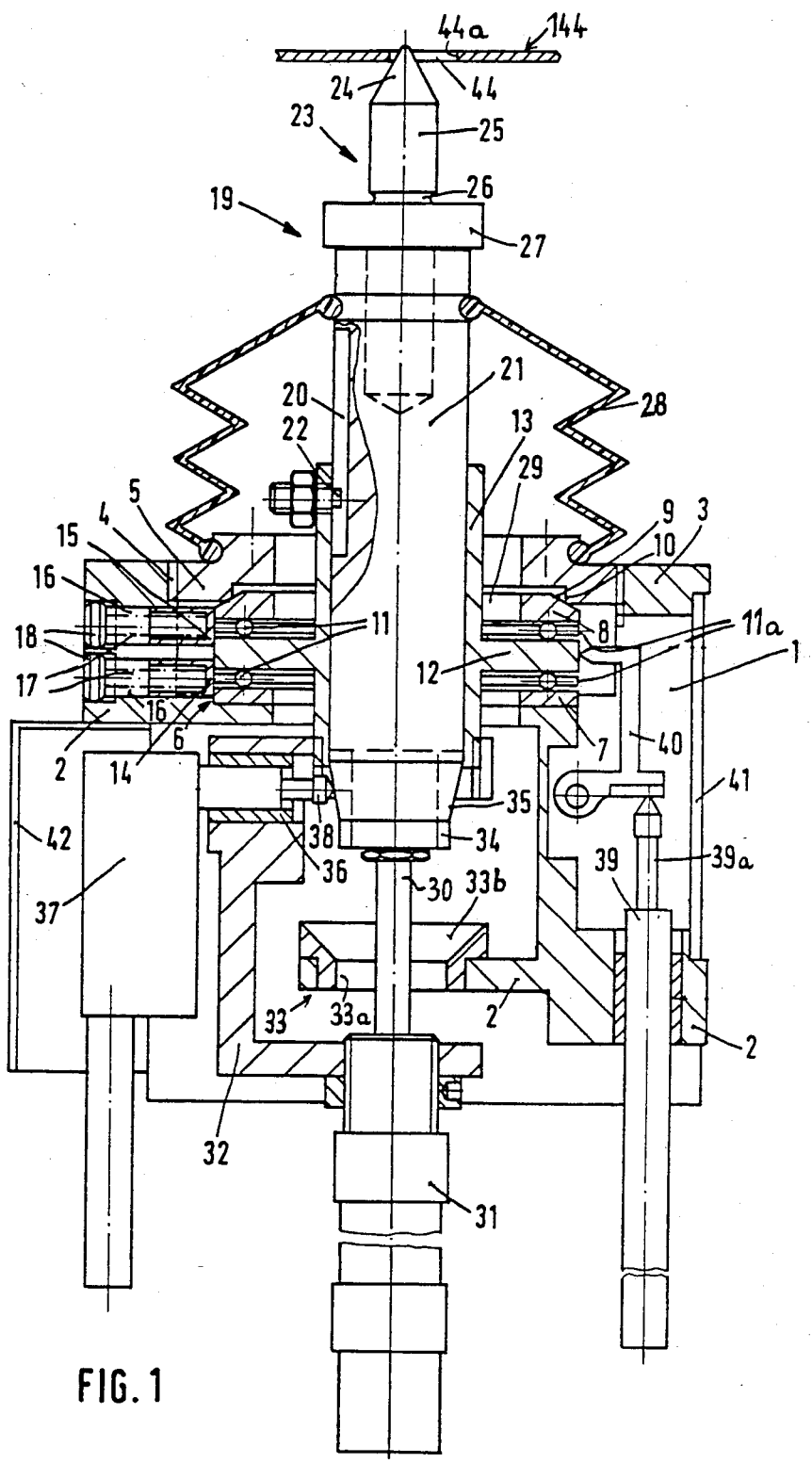
FIG. 1 is a central sectional view of an apparatus which embodies one form of the invention and whose mandrel is held in or close to the starting position preparatory to lateral shifting as a result of penetration of its front portion into an improperly positioned opening.

The apparatus which is shown in the drawing serves to ascertain the extent of deviation of the actual position of an opening 44 from a desired or optimum position. The opening 44 is formed in a metallic workpiece 144, e.g., in a door which is about to be secured to the main portion of the frame of a motor vehicle. The workpiece 144 is held in a predetermined position and the deviation of the actual position of the opening 44 therein from the desired position can be attributed to uncontrollable deformation during shaping of the workpiece, to minor deviations of the position of the workpiece from an optimum position, to deviation of the temperature of ambient air from a prescribed temperature and/or to other factors. That portion of the workpiece 144 which defines the opening 44 is located in a horizontal plane, and the opening is a circular hole or bore bounded by a short cylindrical surface 44a.

The apparatus includes a frame or housing 1 which constitutes an element of the means for supporting an upright probe 19 in the form of a mandrel. The frame 1 is or can be mounted in a measuring frame, either alone or together with one or more additional frames 1 (depending on the number of openings in the workpiece 144 or depending on the number of openings in discrete workpieces which are to be gauged in a simultaneous operation). For example, the apparatus of the present invention can be mounted on a measuring frame which further carries one or more gauging tools of the type disclosed in commonly owned copending U.S. patent application Ser. No. 321,794 filed Nov. 16, 1981, now U.S. Pat. No. 4,434,559 granted Mar. 6, 1984. The measuring frame can be held in proper position with reference to a large cutout or aperture in the main portion of the chassis of a motor vehicle, e.g., an aperture which is to receive a door or which is to be closed by the hood or by the cover of the trunk.

The frame 1 is secured to the aforementioned measuring frame through the medium of its base 2 which carries an annular top wall 3 having an internal thread 4 in mesh with the internal thread of a ring-shaped centering insert 5. The base 2 is formed with a seat 6 for a ring-shaped lower guide member 7 which is concentric with and is spaced apart from a ring-shaped upper guide member 8. The marginal portion of the upper side of the upper guide member 8 constitutes a frustoconical surface (denoted by the reference character 9) which is engaged by an annular centering portion 10 of the insert 5. The centering portion 10 can constitute a shoulder at the inner side of the insert 5. The guide members 7 and 8 flank a horizontal flange 12 which surrounds and is integral with a vertical sleeve 13. A first annulus of spherical antifriction rolling elements 11 is interposed between the upper side of the flange 12 and the upper guide member 8, and a similar second annulus of spherical antifriction rolling elements 11 is interposed between the underside of the flange 12 and the upper side of the lower guide member 7. The sleeve 13 and its flange 12 can be said to constitute a first guide means which permits reciprocatory movements of an elongated cylindrical shank 21 forming the median part of the mandrel 19. The guide members 7, 8 and the two annuli of rolling elements 11 can be said to constitute a second guide means which serves to confine the first guide means to movements laterally of the mandrel 19, i.e., to movements at right angles to the axis of the mandrel. The seat 6 of the base 2 ensures predictable and optimal positioning of the lower guide member 7, and the upper guide member 8 can be accurately centered with respect to the lower guide member through the medium of the shoulder 10 on the adjustable ring-shaped centering insert 5 and the frustoconical surface 9 at the upper side of the guide member 8. The arrangement is such that the underside of the ring-shaped guide member 8 is parallel to the upper side of the lower ring-shaped guide member 7, and that such sides of the two guide members are located in planes which are normal to the axis of the mandrel 19.

The peripheral surface of the flange 2 is contacted by three equidistant pairs of yieldable biasing members 14, 15 in the form of short cylinders having closed inner ends which normally contact the flange 12 and open outer ends for reception of portions of coil springs 17 which urge the closed ends of the biasing members radially of and against the peripheral surface of the flange 12. The biasing members 14 and 15 are reciprocable in bores 16 which are provided therefor in the base 2, and the outer end portions of such bores are tapped to receive adjusting screws 18 whose heads are accessible at the exterior of the frame 1. The upper biasing members 15 engage the peripheral surface of the flange 12 as well as the peripheral surface of the upper guide member 8, and the lower biasing members 14 engage the peripheral surface of the flange 12 as well as the peripheral surface of the lower guide member 7 when the mandrel 19 is held in a starting position which coincides with or is close to the position of FIG. 1. In such starting position, the axis of the mandrel 19 coincides with the axis of the cylindrical surface 44a surrounding the opening 44 if the latter is held in the desired position. The annuli of rolling elements 11 are disposed in cages 11a. The upper cage 11a is centered by the upper biasing members 15 and the lower cage 11a is centered by the lower biasing members 14.

The shank 21 of the mandrel 19 has an axially parallel groove 20 for the tip of a screw 22 which meshes with the sleeve 13 of the first guide means and confines the mandrel 19 to axial movements up and down, as viewed in FIG. 1. The uppermost or front portion 24 of the mandrel 19 is a cone which is made of hard metal and diverges gradually toward a main portion 25 which is an elongated cylinder having a diameter matching or closely approximating the diameter of the cylindrical surface 44a. It will be noted that the front portion 24 is receivable in the opening 44 with a certain amount of clearance which decreases to zero when the opening 44 is entered into by the main portion 25. The lowermost part of the main portion 25 has a circumferential groove 26 directly above a larger-diameter rear portion or collar 27 which constitutes a stop because it cannot enter the opening 44 and thus abuts against the underside of the workpiece 144 in the upper end position of the mandrel 19. The interior of the frame 1 is sealed against entry of dust and/or other foreign matter by a bellows 28 whose uppermost part is affixed to the shank 21 at a level below the collar 27 and whose lowermost part is affixed to the centering insert 5. This bellows prevents contaminants from entering the interior of the frame 1 by way of a ring-shaped aperture 29 which is surrounded by the insert 5 and surrounds the sleeve 13 at a level above the flange 12.

The lower end portion of the mandrel 19 is connected with the piston rod 30 of a double-acting fluid-operated (e.g., pneumatic) motor 31 which constitutes a means for moving the mandrel 19 axially with reference to the first guide means including the sleeve 13 and its flange 12. The cylinder of the motor 31 is affixed to a carrier 32 in the form of a yoke which is secured to or made integral with the lowermost part of the sleeve 13, i.e., the motor 31 is compelled to share all lateral movements of the mandrel 19 and first guide means 12, 13 with reference to and in directions determined by the second guide means including the guide members 7 and 8.

A centering or resetting member 33 is mounted in the base 2 to spacedly surround the piston rod 30 of the motor 31 and to steer a cylindrical lower or rear end portion 34 of the mandrel 19 into a complementary socket 33a when the mandrel 19 moves toward its lower end position. This ensures that the mandrel 19 reassumes its starting position before the motor 31 is actuated again to move the front portion 24 upwardly toward and into an opening 44. The upper part of the resetting member 33 has a conical internal surface 33b which steers the rear portion 34 into the socket 33a during the last stage of movement of the mandrel 19 to its lower end position. The resetting member 33 also serves to return the first guide means 12, 13 to its starting position (through the medium of the shank 21).

Figure 2:
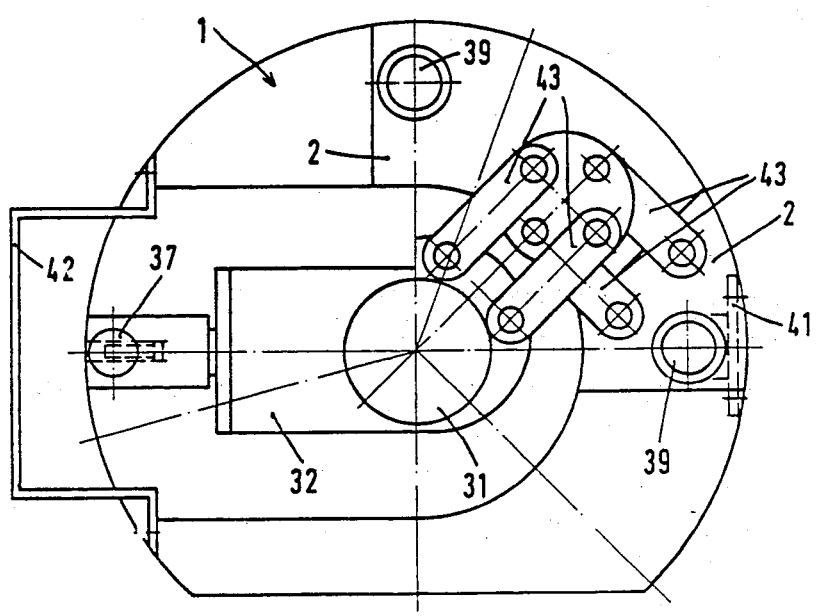
FIG. 2 is a bottom plan view of the apparatus which is shown in FIG. 1.

That portion 35 of the mandrel 19 which is disposed immediately above the cylindrical lower end portion 34 constitutes the frustum of a cone and is contacted by a radially extending horizontal sensor 38 reciprocable in a short cylinder 36 of the yoke 32 and forming part of a gauge 37. Two additional measuring gauges 39 are mounted in the base 2 and their sensors are substantially U-shaped levers 40 which are pivotable in the base and those upper portions contact the peripheral surface of the flange 12. Thus, the extent of pivotal movement of the levers 40 is indicative of the displacement of the first guide means 12, 13 (and hence of the mandrel 19) from its starting position in a particular direction, as considered at right angles to the axis of the mandrel. The lower portions of the levers 40 abut against vertically movable pin-shaped components 39a of the respective gauges 39 and the extent of displacement of components 39a from their normal positions is indicative of the extent of lateral movement of the mandrel 19 in the respective direction. FIG. 2 shows that the angular distance between the two gauges 39, as considered in the circumferential direction of the frame 1, equals or approximates 90 degrees.

FIGS. 1 and 2 further show two sheet metal panels 41 and 42 which are secured to the frame 1 by screws or other types of fasteners. FIG. 2 also shows two parallel mechanisms 43 which are linked to each other and connect the base 2 of the frame 1 with the yoke 32 for the motor 31 and first guide means 12, 13. These parallel mechanisms also hold the flange 12 to movement in a plane which is normal to the axis of the mandrel 19 and they further serve to prevent rotation of the sleeve 12 and flange 13 about their common axis. The exact construction of the two parallel mechanisms 43 forms no part of the invention; all that counts is to ensure that such mechanisms allow the flange 12 to perform a two-dimensional movement between the guide members 7, 8 and that the sleeve 13 is held against rotation about its axis.

The operation is as follows:

As mentioned above, the actual position of the opening 44 in the workpiece 144 of FIG. 1 deviates from the desired or optimum position. The extent of deviation is less than the radius of the surface 44a and main portion 25 so that the tip of the front portion 24 of the mandrel 19 can find its way into the opening when the motor 31 is operated to lift the mandrel through the medium of its piston rod 30. The portions 24 and 25 can constitute a separately produced part or head 23 which is screwed into a tapped bore of the rear portion 27 and the upper part of the shank 21. In FIG. 1, the position of the mandrel 19 deviates slightly from the starting position in which the external surface of the cylindrical rear end portion 34 is in exact register with the cylindrical surface surrounding the socket 33a of the resetting member 33.

The motor 31 is in the process of lifting the mandrel 19 whereby the conical external surface of the front portion 24 strikes against the surface 44a surrounding the opening 44 before the latter receives the main portion 25. Further upward movement of the mandrel 19 entails a lateral movement together with the first guide means 12, 13 against the opposition of certain biasing members 14, 15. In FIG. 1, the surface 44a surrounding the opening 44 causes the mandrel 19 to move laterally (while the orientation of its axis remains unchanged) in a direction to the right as soon as the front portion 24 strikes against the workpiece 144 and the mandrel continues to move upwardly under the action of the motor 31. The lateral movement of the mandrel 19 is shared by the guide means 12, 13, yoke 32 and motor 31. Lateral movement of the mandrel 19 causes the flange 12 to rotate the two annuli of rolling elements 11 with reference to the underside of the upper guide member 8 and the upper side of the lower guide member 7. The extent of lateral displacement of the cages 11a equals half the lateral displacement of the flange 12. The two biasing members 14, 15 which can be seen in the sectional view of FIG. 1 remain in their illustrated positions because they abut against the guide members 7, 8 and because their positions are not influenced by the flange 12 which moves in a direction to the right, as viewed in FIG. 1. However, the flange 12 changes the positions of the other two pairs of biasing members 14, 15 (one of these pairs is disposed in front of and the other pair is disposed behind the plane of FIG. 1) so that the biasing members 14, 15 of such other two pairs move away from the adjacent portions of the peripheral surfaces of the respective guide members 7 and 8.

The U-shaped lever 40 which is shown in FIG. 1 is pivoted in a clockwise direction in response to rightward movement of the flange 12 so that it depresses the component 39a of the corresponding gauge 39, and the extent of downward movement of the component 39a is a function of the extent of that component of sidewise movement of the mandrel 19 which takes place in the plane of FIG. 1.

As a rule, or at least in many instances, the deviation of the actual position of the opening 44 from its desired position is not necessarily in the plane of FIG. 1. Therefore, the apparatus comprises several gauges 39 so that each of these gauges can ascertain the extent of deviation in the respective direction. The upper gauge 39 of FIG. 2 monitors the extent of deviation of the final position of the mandrel 19 (when the main portion 25 is received in and practically or totally fills the opening 44) in a plane which is normal to the plane of FIG. 1.

This is due to the fact that the angular spacing of the two gauges 39, as considered in the circumferential direction of the flange 12, equals or approximates 90 degrees. If the deviation of the actual position of the opening 44 from the desired position can be measured by both gauges 39, the conical surface of the front portion 24 of the mandrel 19 can engage the surface 44a in the axial position of FIG. 1, i.e., the locus of initial contact between the front portion 24 and the surface 44a is then in front of or behind the plane of FIG. 1.

The upward movement of the mandrel 19 is terminated when the upper side of the rear portion or step 27 comes into contact with the underside of the workpiece 144. At such time (and in departure from the showing of FIG. 1), the sensor 38 of the gauge 37 engages the conical portion 35 at the rear or lower end of the mandrel 19 and enables the gauge 37 to ascertain the extent of axial movement of the mandrel from its starting position in which the portion 34 fills the socket 33a.

The gauges 37, 39, 39 can generate visible or other types of signals which are recorded or transmitted to an evaluating circuit so that the latter can adjust the position of the automatic tool (not shown) which is to introduce a part into the opening 44. Thus, the detection of actual position of the opening 44 (and more particularly of the extent of deviation of the actual position from the desired position) enables the controls for an automatic inserting tool to properly steer a part into the opening 44 even though the position of this opening does not coincide with the desired or optimum position.

The mandrel 19 is thereupon retracted by the piston rod 30 whereby the cylindrical rear portion 34 engages the conical surface 33b and thereupon enters the socket 33a of the resetting member 33 to thereby return the mandrel 19, the first guide means 12, 13 and the yoke 32 with motor 31 to their starting positions. The springs 17 ensure that all of the biasing members 14, 15 bear against the peripheral surface of the flange 12 as well as against the peripheral surfaces of the respective ring-shaped guide members 7, 8 as soon as the mandrel 19 reassumes its starting position. The cages 11a and the respective annuli of rolling elements 11 reassume their starting positions in response to return movement of the flange 12 to its starting position. The biasing members 14, 15 can further serve to ensure that the annuli of rolling elements 11 invariably reassume their starting positions in response to return movement of the mandrel 19 to the position in which its rear end portion 34 is in accurate register with the socket 33a. This can be readily achieved by the simple expedient of providing the cages 11a with circular peripheral surfaces which are engaged by certain biasing members 14, 15 at least shortly before such biasing members return into contact with the peripheral surfaces of the respective guide members 7, 8. Such is a precautionary measure because the cages 11a normally do reassume their starting positions as soon as the rear end portion 34 of the mandrel 19 moves into register with the socket 33a.

Of course, if the deviation of the actual position of the opening 44 is to the left of the desired position, as viewed in FIG. 1, the flange 12 is moved in a direction to the left and causes the two illustrated biasing members 14, 15 to move away from the respective guide members 7, 8. Suitable springs (not specifically shown) urge the components 39a of the gauges 39 against the respective levers 40 so that the illustrated lever 40 then pivots counterclockwise, as viewed in FIG. 1, and the extent of upward movement of the illustrated component 39a is indicative of deviation of the actual position of the opening 44 from the desired position (as considered in the plane of FIG. 1).

In the illustrated embodiment, the outer diameters of the cages 11a match the outer diameters of the flange 12 and guide members 7, 8. This enables the biasing members 14, 15 to center the cages 11a irrespective of the direction of movement of the flange 12 during entry of the front portion 24 of the mandrel 19 into an opening 44 whose position deviates from the desired position.

The improved apparatus can be modified in a number of ways without departing from the spirit of the invention. For example, the portions 24, 25 of the mandrel 19 can be replaced with differently dimensioned and/or configured portions if the apparatus is to ascertain the positions of differently configured and/or dimensioned openings. Furthermore, the head 23 (including the parts 24 and 25) can comprise two or more front portions 24 and an equal number of main portions 25 so that the apparatus can simultaneously ascertain the positions of two or more openings in one and the same workpiece. If a simultaneous or substantially simultaneous penetration of two or more front portions 24 into discrete openings of a workpiece necessitates a certain angular displacement of the mandrel 19 about its axis, the apparatus can be provided with one or more additional gauges which generate signals denoting the extent of such angular displacement of the mandrel to thus enable an automatic inserting tool to properly introduce two or more parts into the respective holes, bores or other forms of openings in one and the same workpiece.

The construction and mode of operation of the improved apparatus are based on the presumption that the departure of the actual position of an opening from its desired position is not extensive, i.e., that the actual position of a circular hole or bore from the desired position will not exceed the radius of the hole or bore. This renders it possible to invariably select the starting position of the mandrel 19 in such a way that its front portion 24 enters the hole or bore when the mandrel is caused to move axially in a direction toward the workpiece. The front portion 24 can readily find its way into the opening 44 in view of the conical shape of its external surface. Of course, such surface can be replaced with a hemispherical surface without departing from the spirit of the invention, especially if the anticipated departure of the actual position from the desired position of the opening is small or very small so that a rounded front portion can readily enter such opening in response to axial movement of the mandrel toward the workpiece. Lateral shifting of the mandrel 19 from its starting position (provided that the actual position of the opening 44 deviates from the desired position) is automatic and does not necessitate the exertion of a substantial force since the flange 12 is movable between the guide members 7, 8 with a minimum of friction and is merely required to overcome the resistance of certain springs 17, namely, the resistance of those springs which act upon biasing members 14, 15 that must be displaced in response to lateral movement of the mandrel 19 from its starting position.

An advantage of the rear portion or stop 27 is that it limits the upward stroke of the mandrel 19 and thus ensures that the main portion 25 is adequately received in the opening 44, i.e., that the gauges 39 can ascertain the full extent of movement of various laterally movable parts from their starting positions. The provision of the gauge 37 is important in the event of a three-dimensional measurement of the position of an opening 44.

The motor 31 can be replaced with any other suitable means for moving the mandrel 19 up and down through strokes of required length. For example, a rack can be used to slidably engage the lower end portion of the mandrel 19 and to be reciprocated by a reversible electric motor through the medium of a pinion. The illustrated motor 31 is preferred at this time due to its simplicity and compactness. Moreover, and since the motor 31 shares the lateral movements of the mandrel 19, its piston rod 30 can be positively coupled to the lower end portion of the mandrel.

The illustrated first guide means 12, 13 exhibits the requisite stability to prevent any changes in orientation of the mandrel 19 with reference to the frame 1. The annuli of rolling elements 11 can be replaced with other types of friction reducing means. Their advantage is simplicity, compactness, low cost and ability to normally reassume their starting positions in automatic response to return movement of the mandrel 19 to its starting position. The cages 11a need not be secured to the flange 12 and/or to the respective guide members 7, 8. Their rolling elements 11 permit the flange 12 to move in its plane (i.e., in a plane making a right angle with the axis of the mandrel 19) even if the insert 5 subjects the upper guide member 8 to a certain pressure so that the underside of the guide member 8 bears against the respective rolling elements 11 with a certain force in order to eliminate undesirable play. Such slight stressing of the upper rolling elements 11 is transmitted to the lower rolling elements 11 via flange 12.

While it is conceivable to use the springs 17 and the pairs of biasing members 14, 15 as the sole means for returning the mandrel 19 to its starting position when the front portion 24 is withdrawn from an improperly positioned opening 44, this would or could necessitate resort to relatively strong springs 17 which would offer a rather pronounced resistance to lateral movements of the mandrel 19 in response to penetration of the front portion 24 into an improperly positioned opening 44. This is the reason for the provision of the resetting member 33 which automatically returns the mandrel 19 and the parts 12, 13, 30, 31 and 32 to their starting positions during the last stage of downward movement of the mandrel.

The positioning of the levers 40 in such a way that they contact the peripheral surface of the flange 12 is desirable and advantageous because the curvature of the peripheral surface of the flange is less pronounced than the curvature of any round surface nearer to the axis of the mandrel 19. This, in turn, ensures that any sliding movements of the peripheral surface of the flange 12 relative to the adjacent tips of the levers 40 cannot unduly influence the accuracy of measurements which are performed by the gauges 39. The levers 40 can be omitted if there is sufficient room to mount the gauges 39 radially of the flange 12, i.e., so that the tips of the reciprocable components 39a bear directly against the peripheral surface of the flange. The illustrated arrangement (wherein the axes of the components 39a are parallel to the axis of the mandrel 19) is preferred in all instances when a reduction of the radial dimensions of the apparatus is more important than a reduction of dimensions in the axial direction of the mandrel.

The provision of the conical portion 35 at the rear end of the mandrel 19 and the provision of the associated gauge 37 allows for three-dimensional detection of deviations of the position of the opening 44 from its optimum or desired position. The sensor 38 of the gauge 37 is movable radially of the mandrel 19. The body of the sensor 37 need not share any movements of the mandrel 19. The purpose of the sensor 38 is to detect the extent of axial displacement of the mandrel 19 from its starting position and the gauge 37 comprises means for converting radial movement of the sensor 38 (under the action of the axially moving frustoconical portion 35) into a vertical movement of a component in the body of the gauge 37 (e.g., by resorting to a lever whose function is analogous to that of the lever 40 shown in FIG. 1). An advantage of the conical portion 35 is that the sensor 38 need not track the position of the mandrel 19 during each and every stage of axial movement of the mandrel. Thus, the axial position of the sensor 38 can remain unchanged except when it receives motion from the conical portion 35. The sensor 38 tracks the portion 35 only shortly before the rear portion or stop 25 engages the underside of the workpiece 144. If such workpiece is deformed so that the opening 44 is located at a level above or below the desired level, the deviation of actual level of the opening 44 from the optimum level is detected and indicated by the gauge 37. Such gauges (as well as the gauges 39) are known in the art and the exact design thereof forms no part of the present invention. Suitable gauges are known as Sangamo gauging transducers and are manufactured and sold by Schlumberger.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. Apparatus for ascertaining the extent of deviation between the desired position and the actual position of an opening having a predetermined size and being provided in a workpiece, especially of a round hole in a bulky workpiece consisting of sheet metal or the like, comprising a mandrel having a main portion arranged to fit snugly into the opening and a front portion which is receivable in the opening with at least some clearance and merges into said main portion to move the mandrel laterally when it strikes the surface surrounding the opening prior to entry of the main portion; means for supporting said mandrel in a starting position wherein said main portion is in at least substantial register with an opening which is held in the desired position, said mandrel being movable axially with reference to said supporting means to thereby introduce said portions thereof into or to withdraw such portions from the opening and said mandrel being further movable in said supporting means laterally away from said starting position in response to establishment of contact between said front portion and the surface surrounding an opening whose actual position deviates from the desired position while said front portion continues to penetrate into such opening, said supporting means including means for confining said mandrel to lateral movements without changes in orientation of the axis of the mandrel; and means for monitoring the extent of movement of the mandrel from said starting position, including a plurality of gauges each arranged to monitor the extent of lateral movement of said mandrel in one of several different directions.

2. The apparatus of claim 1, wherein the main portion of said mandrel has a constant cross-sectional area so that each part thereof can enter an opening having said predetermined size in response to axial movement of said mandrel.

3. The apparatus of claim 2, wherein the front portion of said mandrel includes or constitutes a cone or the frustum of a cone.

4. The apparatus of claim 2, wherein said mandrel further comprises a rear portion whose cross-sectional area exceeds said predetermined size, said main portion being disposed between the front and rear portions of said mandrel.

5. The apparatus of claim 1, further comprising means for moving said mandrel axially with reference to said supporting means.

6. The apparatus of claim 5, wherein said moving means comprises a fluid-operated motor.

7. The apparatus of claim 1, wherein said supporting means comprises first guide means in which said mandrel is movable axially and second guide means which includes said confining means and in which said first guide means is movable at right angles to the axis of said mandrel so that the latter is free to move with said first guide means relative to said second guide means while moving axially relative to said first guide means.

8. The apparatus of claim 7, wherein said mandrel comprises a shank and said portions thereof are disposed at one end of said shank, said first guide means comprising a sleeve and said shank being reciprocable in said sleeve.

9. The apparatus of claim 8, wherein said sleeve comprises an external flange disposed in a plane which is normal to the axis of said mandrel and said second guide means is arranged to maintain said flange in said plane while permitting said sleeve to move laterally.

10. The apparatus of claim 9, wherein said second guide means comprises first and second guide members flanking said flange.

11. The apparatus of claim 10, wherein said guide members are rings.

12. The apparatus of claim 10, wherein said second guide means further comprises antifriction rolling elements which are interposed between said flange and at least one of said guide members.

13. The apparatus of claim 12, wherein said rolling elements include an annulus of spheres.

14. The apparatus of claim 10, wherein said supporting means further comprises a frame for one of said guide members and centering means for maintaining the other of said guide members in a predetermined position with reference to said one guide member.

15. The apparatus of claim 14, wherein said guide members are rings and said other ring has a conical surface, said centering means comprising an annular centering element engaging said conical surface to thereby hold said other ring in a position of concentricity with said one ring.

16. The apparatus of claim 10, wherein said second guide means further comprises annuli of antifriction rolling elements interposed between said flange and said guide members, said annuli being movable in parallelism with said plane and further comprising biasing means for yieldably opposing movements of said annuli relative to the respective guide members.

17. The apparatus of claim 1, further comprising means for moving said mandrel axially, said mandrel further having an additional portion remote from said main portion and further comprising means for centering said additional portion to thereby move the mandrel to said starting position in response to axial movement of said mandrel in a direction to withdraw said front portion from an opening.

18. The apparatus of claim 1, wherein said supporting means includes first guide means in which said mandrel is movable axially and second guide means including said confining means and arranged to restrict said first guide means to movements in directions at right angles to the axis of said mandrel, said monitoring means including at least one lever which is pivotable by said first guide means.

19. The apparatus of claim 18, wherein said first guide means comprises a sleeve for said mandrel and an external flange provided on said sleeve, said flange having a peripheral surface and said lever being pivotably mounted in said supporting means and being pivotable by the peripheral surface of said flange.

20. The apparatus of claim 1, wherein said supporting means comprises first guide means in which said mandrel is movable axially and second guide means including said confining means and arranged to confine said first guide means to movements at right angles to the axis of said mandrel, and further comprising means for holding said first guide means against rotation about the axis of said mandrel.

21. The apparatus of claim 20, wherein said supporting means further comprises a frame and said holding means comprises at least one parallel mechanism connecting said first guide means to said frame.

22. The apparatus of claim 1, wherein said monitoring means further comprises an additional gauge for monitoring the extent of axial movement of said mandrel.

23. The apparatus of claim 22, wherein said mandrel further comprises a conical portion and said additional gauge comprises a sensor movable at right angles to the axis of said mandrel and engaging said conical portion, at least during certain stages of axial movement of said mandrel.

* * * * *